United States Patent [19]
Minami et al.

[11] Patent Number: 5,947,824
[45] Date of Patent: Sep. 7, 1999

[54] FLIGHT SIMULATION GAME APPARATUS

[75] Inventors: Kojiro Minami; Katsunori Okita, both of Kobe, Japan

[73] Assignee: Konami Co., Ltd., Hyogo-ken, Japan

[21] Appl. No.: 08/969,021

[22] Filed: Nov. 12, 1997

[30] Foreign Application Priority Data

Nov. 14, 1996 [JP] Japan .................................. 8-303058

[51] Int. Cl.⁶ ................................................ A63B 17/02
[52] U.S. Cl. ................................. 463/37; 463/31; 434/30
[58] Field of Search ................................ 463/30, 31, 36, 463/37; 273/317.1, 317.2, 317.3, 317.4, 317.5, 317.6, 148 B, 358; 434/247, 308, 309, 30

[56] References Cited

U.S. PATENT DOCUMENTS

| | | | |
|---|---|---|---|
| 4,268,036 | 5/1981 | Yokoi | 273/358 |
| 4,355,982 | 10/1982 | James . | |
| 4,710,129 | 12/1987 | Newman et al. | 463/30 |
| 4,711,447 | 12/1987 | Mansfield | 463/37 |
| 4,817,950 | 4/1989 | Goo | 273/148 B |
| 5,195,746 | 3/1993 | Boyd et al. | 463/37 |
| 5,252,068 | 10/1993 | Gryder . | |
| 5,364,271 | 11/1994 | Aknin et al. | 273/148 B |
| 5,584,700 | 12/1996 | Feldman et al. | 434/247 |
| 5,713,794 | 2/1998 | Shimojima et al. | 463/31 |
| 5,860,861 | 1/1999 | Lipps et al. | 463/36 |

*Primary Examiner*—Jessica J. Harrison
*Assistant Examiner*—John Paradiso
*Attorney, Agent, or Firm*—Jordan and Hamburg LLP

[57] ABSTRACT

A flight simulation game apparatus allows a game player to simulate hang glider maneuvers through physical sensations. A control lever which can be gripped by the hands of the game player is mounted on a framework and extends in transverse directions of the frame work. The control lever can be moved in longitudinal directions of the framework by a control lever moving mechanism mounted on the framework. While in simulated flight, the game player can view at least a front simulated scene image is displayed by a display monitor. A control system vertically scrolls the front simulated scene image displayed by the display monitor in response to movement of the control lever in the longitudinal direction. The control lever moving mechanism also allows the control lever to be moved in the transverse direction and also angularly moved about a vertical axis, and the control system horizontally scrolls the displayed front simulated scene image in response to movement of the control lever in the transverse direction and angular movement of the control lever about the vertical axis.

18 Claims, 7 Drawing Sheets

FLIGHT SIMULATION GAME APPARATUS

BACKGROUND OF THE INVENTION

1. Field of the Invention

The present invention relates to a flight simulation game apparatus for enabling a game player to enjoy simulated flying experiences through physical sensations with a flight vehicle such as a hang glider or the like.

2. Description of the Prior Art

There are known various conventional vehicle simulation game apparatus which are operated by game players to attain physical sensations to enjoy simulated vehicle driving experiences. Vehicle simulation games that can be played on such vehicle simulation game apparatus include car races, ski races, surfboard races, motorboat races, etc. The vehicle simulation game apparatus have various control members that can manually be controlled by game players. For example, a ski simulation game apparatus has a board to be stepped on by the feet of the game player and two poles to be gripped by the hands of the game player. Car and motorboat simulation game apparatus have a seat to be seated in by the game player, a steering wheel to be handled by the hands of the game player, and accelerator and brake pedals to be controlled by the feet of the game player. The game player controls these control members to pass a competitor or opponent included in a foreground displayed on a display monitor screen and also to deftly avoid obstacles in the foreground which may be cars or boats that are controlled by a computer.

The above conventional vehicle simulation game apparatus give game players driving experiences on land or water. Their control members, which are gripped by the hands or stepped on by the feet, are controlled to change the direction of the simulated vehicle to the right or left, and hence are only required to move to the right and left. Therefore, the conventional vehicle simulation game apparatus are quite similar to each other with respect to control actions, and are subject to limitations in arousing new interests to game players.

SUMMARY OF THE INVENTION

It is therefore an object of the present invention to provide a flight simulation game apparatus which enables a game player to gain physical sensations of flight in midair based on forward and backward control actions using both hands, or leftward and rightward control actions using both legs, or forward and backward control actions using both hands and leftward and rightward control actions using both legs.

According to an aspect of the present invention, a flight simulation game apparatus includes a framework having transverse and longitudinal directions, a control lever for being gripped by the hands of a game player positioned behind the control lever, the control lever being mounted on the framework and extending in the transverse direction, a control lever moving mechanism mounted on the framework, for allowing the control lever to be moved in the longitudinal direction with respect to the framework, a display monitor mounted on the framework, for displaying at least a front simulated scene image, and display control means for vertically scrolling the front simulated scene image displayed by the display monitor in response to movement of the control lever in the longitudinal direction.

When the game player moves the control lever in the longitudinal direction of the framework, the front simulated scene image displayed by the display monitor is scrolled vertically in response to the movement of the control lever. Specifically, when the game player pushes the control lever forwardly, the front simulated scene image is scrolled downwardly, indicating that the game player ascends or is lifted in the simulated flight, and when the game player pulls the control lever rearwardly, the front simulated scene image is scrolled upwardly, indicating that the game player descends or is lowered in the simulated flight. Data of simulated images to be displayed cover a wide variety of scenes including a scene where the simulated flight starts, and also include various objects and obstacles such as mountains, flight objects, clouds, etc., making the simulated flight highly realistic. The game player can avoid displayed objects and obstacles in the simulated flight by moving the control lever.

The control lever moving mechanism may include a mechanism for allowing the control lever to be moved in the transverse direction, and the display control means comprises means for horizontally scrolling the front simulated scene image displayed by the display monitor in response to movement of the control lever in the transverse direction.

Since the control lever is movable also in the transverse direction and the displayed front simulated scene image is scrolled horizontally, indicating that the game player makes a turn in the simulated flight, in response to movement of the control lever in the transverse direction, the game player can feel highly realistic in maneuvering a flight vehicle such as a hang glider. When the game player moves the control lever in both the longitudinal and transverse directions, the displayed front simulated scene image is scrolled obliquely, indicating that the flight vehicle is lifted or lowered while making a turn.

The control lever moving mechanism may include a mechanism for allowing the control lever to be angularly moved about a vertical axis, and the display control means comprises means for scrolling the front simulated scene image displayed by the display monitor in response to angular movement of the control lever about the vertical axis.

Therefore, angular movement of the control lever about the vertical axis can be reflected in the displayed front simulated scene image as it is scrolled in response to such angular movement of the control lever.

According to another aspect of the present invention, a flight simulation game apparatus includes a framework having transverse and longitudinal directions, a body holder operatively coupled to the framework, for holding the body of a game player thereon, a control lever for being gripped by the hands of the game player positioned behind the control lever, the control lever being mounted on the framework and extending in the transverse direction, a body holder moving mechanism for allowing the body holder to be moved in the transverse direction with respect to the framework, a display monitor mounted on the framework, for displaying at least a front simulated scene image, and display control means for horizontally scrolling the front simulated scene image displayed by the display monitor in response to movement of the body holder in the transverse direction.

The game player places the thighs and legs on the body holder, while holding the control lever with the hands. When the game player moves the body holder with the thighs and legs, the front simulated scene image displayed by the display monitor is scrolled horizontally in response to the movement of the body holder. Specifically, when the game player moves the body holder to the right, the displayed front simulated scene image is scrolled to the right, indicating that the game player is making a left turn, and when the game player moves the body holder to the left, the displayed front simulated scene image is scrolled to the left, indicating that the game player is making a right turn.

The body holder moving mechanism may comprise a mechanism for allowing the body holder to be angularly moved about a vertical axis, and the display control means comprises means for scrolling the front simulated scene image displayed by the display monitor in response to angular movement of the body holder about the vertical axis.

The body holder may include a leg rest for placing the legs of the game player thereon, the leg rest being angularly movable about a longitudinal axis extending in the longitudinal direction, and the display control means may comprise means for scrolling the front simulated scene image displayed by the display monitor in response to angular movement of the body holder about the longitudinal axis.

Therefore, angular movement of the body holder about the horizontal axis can be reflected in the displayed front simulated scene image as it is scrolled in response to such angular movement of the body holder.

The body holder may include a leg rest for placing the legs of the game player thereon and a thigh support for supporting the thighs of the game player thereon. The game player with the legs placed on the leg rest and the thighs placed on the thigh support can feel as if riding on an actual flight vehicle such as a hang glider.

The leg rest may be inclined downwardly in a forward direction toward the framework, and the thigh support may be inclined upwardly in the forward direction. The leg rest and the thigh support thus inclined permit the game player to be supported in a stable attitude which is similar to the attitude in actual flight.

According to still another aspect of the present invention, a flight simulation game apparatus includes a framework having transverse and longitudinal directions, a body holder operatively coupled to the framework, for holding the body of a game player thereon, a control lever for being gripped by the hands of the game player positioned behind the control lever, the control lever being mounted on the framework and extending in the transverse direction, a body holder moving mechanism for allowing the body holder to be moved in the transverse direction with respect to the framework, a control lever moving mechanism mounted on the framework, for allowing the control lever to be moved in the longitudinal direction with respect to the framework, a display monitor mounted on the framework, for displaying at least a front simulated scene image, and display control means for horizontally scrolling the front simulated scene image displayed by the display monitor in response to movement of the body holder in the transverse direction, and vertically scrolling the front simulated scene image displayed by the display monitor in response to movement of the control lever in the longitudinal direction.

When the game player moves the control lever forwardly or rearwardly, the game player ascends or descends in the simulated flight, and when the game player moves the body holder to the left or the right, the game player makes a right turn or a left turn.

The control lever moving mechanism may include a biasing mechanism for biasing the control lever to return to a reference position. Since the control lever automatically returns to the reference position under biasing forces from the biasing mechanism when the control lever is released, the game player is not required to apply forces to return the control lever.

The body holder moving mechanism may include a biasing mechanism for biasing the body holder to return to a reference position. Since the body holder automatically returns to the reference position under biasing forces from the biasing mechanism when the body holder is released, the game player is not required to apply forces to return the body holder.

Each of the biasing mechanisms may comprise a mechanism for generating recovery forces against an applied angular displacement at a rate that increases in proportion to the displacement from the reference position. The biasing mechanisms thus arranged permits the game player to control the control lever and the body holder smoothly with natural responses.

The display monitor may comprise a display monitor for displaying the front simulated scene image in an upper screen area thereof and displaying a lower simulated scene image in a lower screen area thereof. More specifically, the display monitor may comprise a first monitor unit for displaying the front simulated scene image, the first monitor being disposed in front of the control lever and having a monitor screen facing rearwardly toward the control lever, and a second monitor unit for displaying a lower simulated scene image, the second monitor unit being disposed below the control lever and having a monitor screen facing upwardly. Inasmuch as the game player can view front and lower simulated scene images displayed respectively in the upper and lower screen areas or the first and second monitor units, the game player visually feels highly realistic because of the displayed images.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
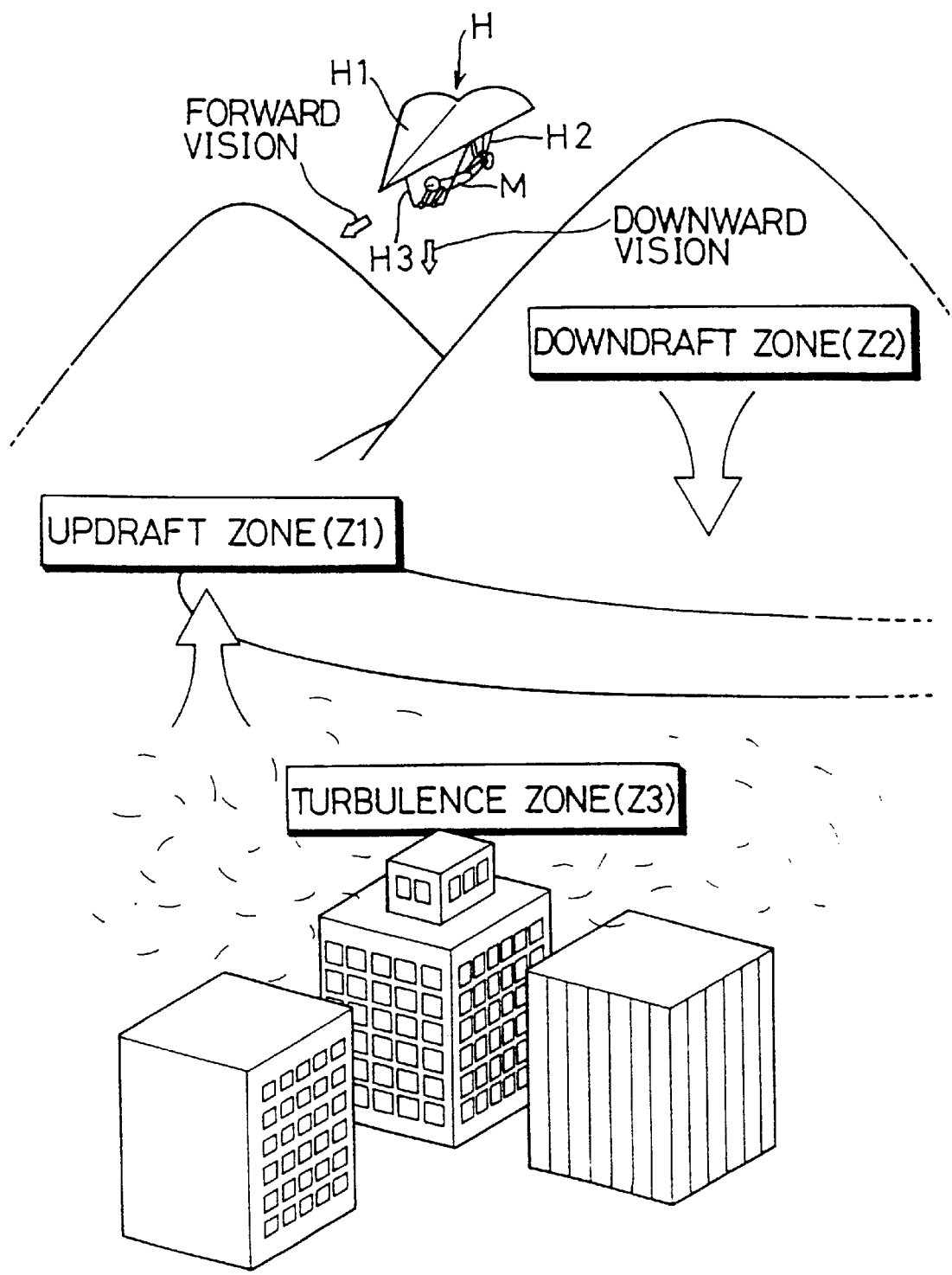
FIG. 1 is a schematic perspective view showing an actual flight environment that can be simulated in a flight simulation game which is played on a flight simulation game apparatus according to the present invention.

As shown in FIG. 1, a flight simulation game apparatus 1 (see FIG. 2) according to the present invention simulates a hang glider H as a flight vehicle to enable a game player to experience physical sensations of flight in midair in a flight simulation game. The hang glider H is in the shape of an isosceles triangle as viewed in plan, and has a lightweight metal frame and a triangular wing H1 of cloth which is attached to the lightweight metal frame.

The hang glider H also has a hanger H2 for supporting a pilot M, the hanger H2 being connected to and extending downwardly from a central portion of the lightweight metal frame. The hang glider H further includes a horizontal control lever H3 connected to and extending downwardly from a front portion of the lightweight metal frame. The pilot M suspended by the hanger H2 moves the control lever H3 horizontally in one direction or the other to turn the hang glider H to the left or right. The pilot M can also change the direction of the hang glider H or lift or lower the hang glider H by shifting the body weight through the hanger H2.

As shown in FIG. 1, an actual flight environment includes an updraft zone Z1, a downdraft zone Z2, and a turbulence zone Z3. The hang glider H in flight is lifted when it enters the updraft zone Z1 and lowered when it enters the downdraft zone Z2, and becomes unstable when it enters the turbulence zone Z3. While in flight in the flight environment, the pilot M controls the control lever H3 to fly over a plain and a river, avoid a mountain, and maneuver the hang glider H in the turbulence zone Z3 with flying techniques for thereby enjoying soaring experiences.

The flight simulation game apparatus 1 enables the game player to experience and enjoy the simulated flight of the hang glider H. The flight simulation game apparatus 1 is arranged to hold the game player in an attitude which simulates the suspended position of the pilot M on the hanger H2, and also to display three-dimensional images of forward and downward scenes as viewed in the directions indicated by the arrows. The displayed three-dimensional images change as the game player make control actions in a manner similar to actual control actions, so that the game player can gain simulated visual flight experiences similar to actual visual flight experiences.

The flight simulation game apparatus 1 will be described in detail below with reference to FIG. 2 through 7A, 7B.

Figure 2:
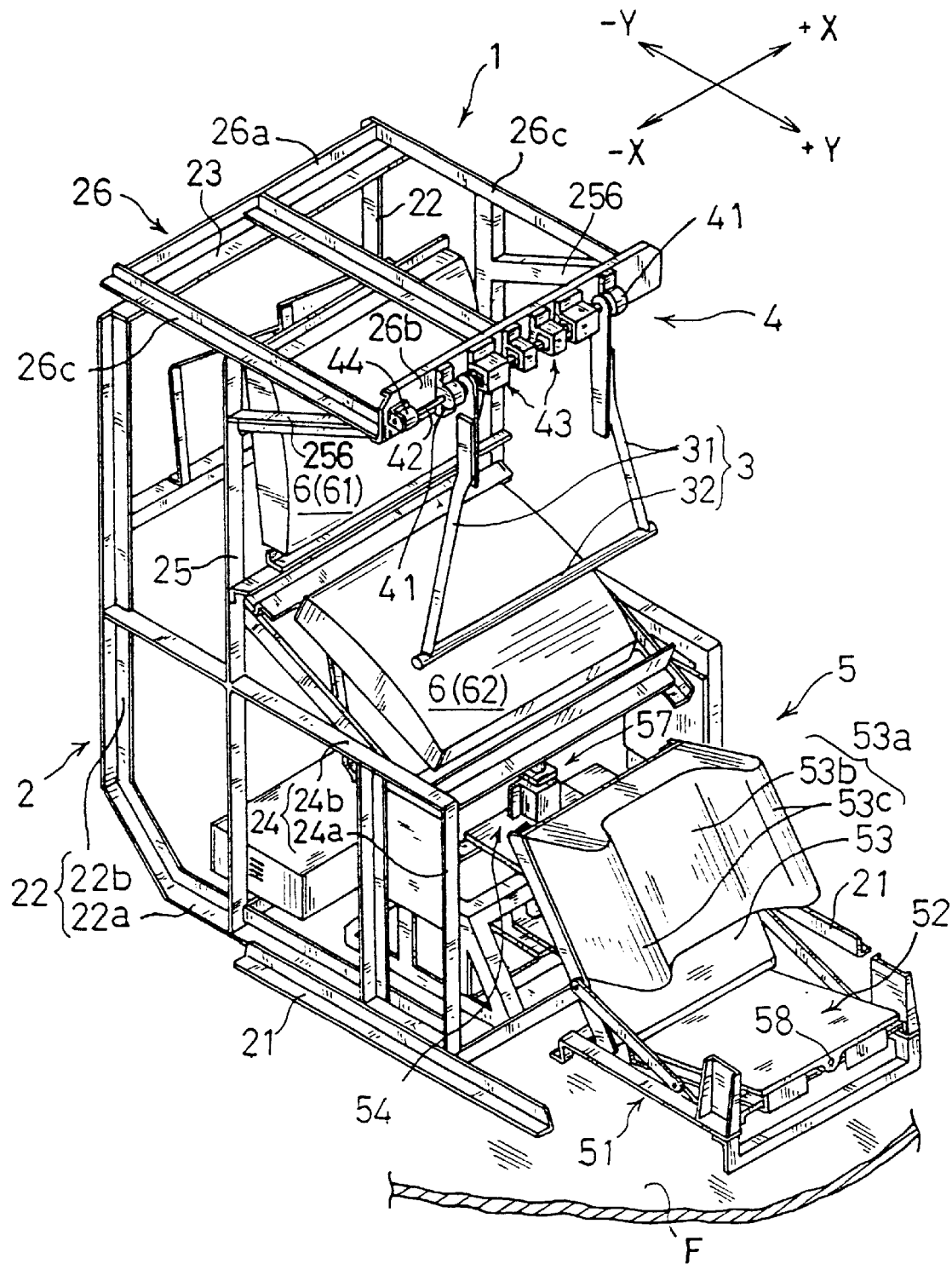
FIG. 2 is a perspective view of an internal structure of the flight simulation game apparatus which incorporates a control lever moving mechanism according to a first embodiment of the present invention.

FIG. 2 shows an internal structure of the flight simulation game apparatus 1, which incorporates a control lever moving mechanism 4 according to a first embodiment of the present invention. Principal directions with respect to the internal structure of the flight simulation game apparatus 1 will hereinafter be referred to as transverse directions indicated by the arrows +X, −X and longitudinal directions indicated by the arrows +Y, −Y in FIG. 2. Particularly, the direction indicated by the arrow −X will be referred to as a leftward direction, the direction indicated by the arrow +X as a rightward direction, the direction indicated by the arrow −Y as a forward direction, and the direction indicated by the arrow +Y as a backward direction.

The flight simulation game apparatus 1 comprises a framework 2 made up of a three-dimensional assembly of angles, a control lever 3 mounted on a rear end of an upper portion of the framework 2, a control lever moving mechanism 4 on which the control lever 3 is supported for movement in the longitudinal directions, a body holder 5 for holding the legs of a game player, the body holder 5 being positioned on a rear end of a lower portion of the framework 2, a display monitor 6 for displaying images of simulated scenes while in flight, and a control system (display control means) 7 having a microcomputer for scrolling displayed images on the display monitor 6.

The term "scrolling" is used herein to mean continuous movement through three-dimensional images of scenes displayed by the display monitor 6 during simulated flight based on control actions on the control lever 3.

The framework 2 has a pair of transversely spaced base frames 21 installed in a floor F and a pair of transversely spaced L-shaped frames 22 supported respectively on the base frames 21. Each of the L-shaped frames 22 comprises a horizontal bar 22a fixed to one of the base frames 21 and a vertical bar 22b extending vertically from an end of the horizontal bar 22a remotely from the base frame 21. The vertical bars 22b of the L-shaped frames 22 have respective upper ends interconnected by an upper front horizontal bar 23.

Rear ends of the horizontal bars 22a and intermediate portions of the vertical bars 22b are interconnected by a pair of transversely spaced intermediate frames 24 each comprising a vertical bar 24a and a horizontal bar 24b. The horizontal bars 24b, whose rear ends are joined to respective upper ends of the vertical bars 24a, are joined to respective transversely spaced upstanding frames 25 which have respective lower ends connected to the respective horizontal bars 22a near front ends thereof.

The upstanding frames 25 have respective upper ends positioned at substantially the same height as the upper front horizontal bar 23. The upper ends of the upstanding frames 25 and the upper front horizontal bar 23 support thereon a substantially square frame 26 which comprises a front transverse horizontal bar 26a, a rear transverse control lever support plate 26b spaced longitudinally from the front transverse horizontal bar 26a, and a pair of transversely spaced, longitudinal joint bars 26c extending between and interconnecting the ends of the front transverse horizontal bar 26a and the rear transverse control lever support plate 26b. The rear ends of the joint bars 26c are connected to the upstanding frames 25 by diagonal bracings 256. Accordingly, the substantially square frame 26 is stably supported on the upstanding frames 25 and the upper front horizontal bar 23 with the aid of the diagonal bracings 256.

The control lever 3, the control lever moving mechanism 4, the body holder 5, the display monitor 6, and the control system 7 are supported on the framework 2 of the above structure as described in detail below.

The control lever 3 is attached to the control lever support plate 26b through the control lever moving mechanism 4 for movement in the longitudinal directions. The control lever 3 is basically of a U shape that slightly spreads downwardly as viewed in the forward direction −Y from the body holder 5. Specifically, the control lever 3 comprises a pair of transversely spaced vertical rods 31 extending downwardly from opposite sides of the control lever moving mechanism 4 and progressively spreading away from each other, and a horizontal grip rod 32 extending between and connected to lower ends of the vertical rods 31. The game player grips the grip rod 32 with both hands and moves the grip rod 32 in the longitudinal directions −Y, +Y to make control actions for playing the flight simulation game.

Figure 3A:
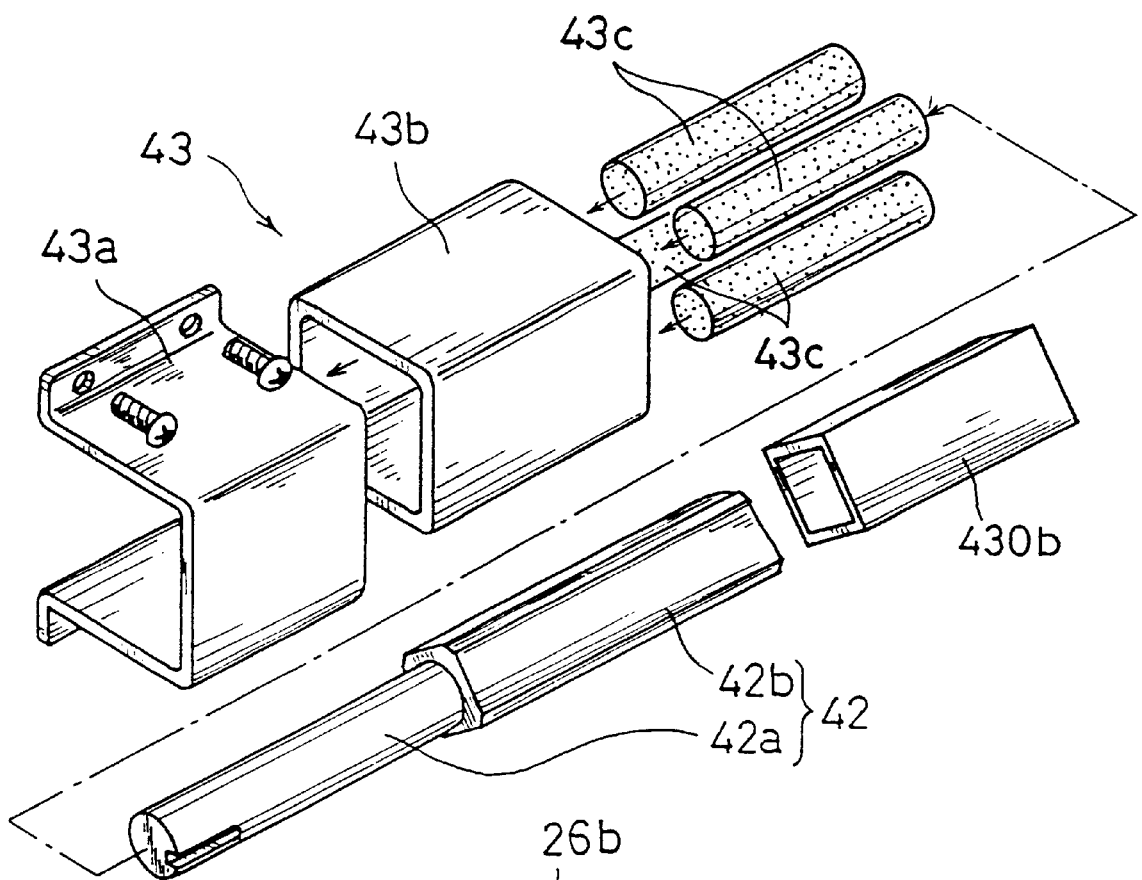
FIG. 3A is an exploded fragmentary perspective view of a biasing structure of the flight simulation game apparatus.
Figure 3B:
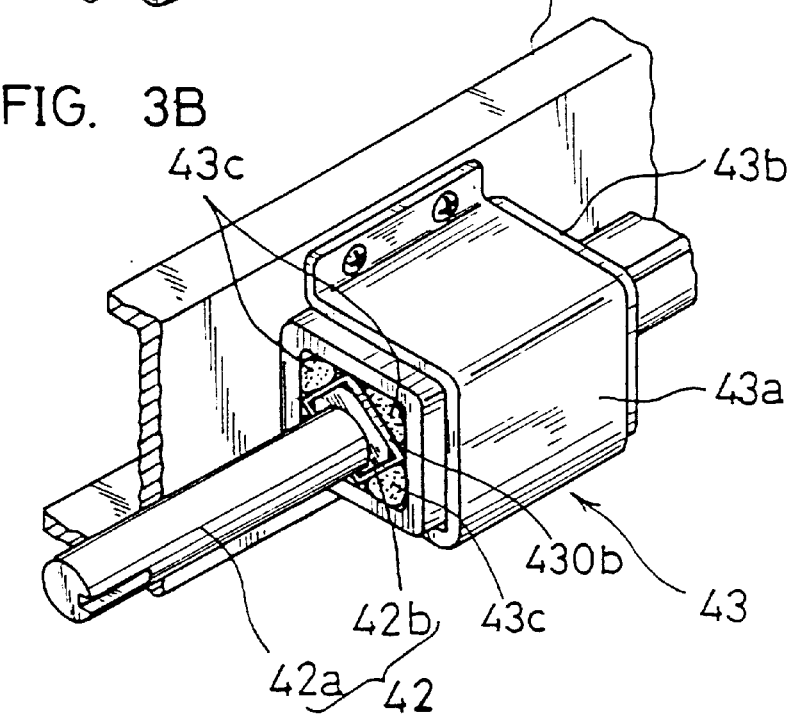
FIG. 3B is a fragmentary perspective view of the biasing structure.

The control lever moving mechanism 4 comprises a pair of transversely spaced bearings 41 mounted on the control lever support plate 26b, a horizontal shaft 42 rotatably supported by the bearings 41 for angular movement about its own axis, a plurality of biasing structures 43 mounted on the control lever support plate 26b and spaced along the horizontal shaft 42 between the bearings 41, for imparting resistive or biasing forces to the horizontal shaft 42 against angular movement thereof, and an angular displacement sensor 44 mounted on the control lever support plate 26b and connected coaxially to a left end of the horizontal shaft 42 for detecting an angular displacement of the horizontal shaft 42. As shown in FIGS. 3A and 3B, the horizontal shaft 42 comprises a pair of cylindrical rods 42a (only one shown) rotatably supported by the bearings 41 and a prismatic rod 42b extending between the cylindrical rods 42a. The vertical rods 31 of the control lever 3 have respective upper ends fixed to the horizontal shaft 42 near the respective bearings 41 so that the horizontal shaft 42 can be angularly moved about its own axis when the control lever 3 is moved in the longitudinal directions −Y, +Y by the game player.

One of the biasing structures 43 is shown in detail in FIGS. 3A and 3B. Since the biasing structures 43 are identical to each other, only the biasing structure 43 shown in FIGS. 3A and 3B will be described below. The biasing structure 43 is constructed such that it generates recovery forces against an applied angular displacement at a rate that increases in proportion to the displacement from a reference position. Specifically, the biasing structure 43 comprises a channel-shaped bracket 43a fixed to the control lever support plate 26b, an outer tube 43b of rectangular cross section housed in the bracket 43a, an inner tube 430b of rectangular cross section fitted in the outer tube 43b, and four cylindrical rubber recovery members 43c interposed between the outer tube 43b and the inner tube 430b.

The inner tube 430b has an inner hole defined therein whose dimensions are slightly greater than the dimensions of the prismatic rod 42b. The inner tube 430b and the prismatic rod 42b fitted therein can rotate in unison with each other about the axis of the horizontal shaft 42.

As shown in FIG. 3B, the inner tube 430b placed in the outer tube 43b has its four corners facing the respective sides of the outer tube 43b, leaving four spaces of triangular cross section between the four outer sides of the inner tube 430b and the four corners of the outer tube 43b. The four cylindrical rubber recovery members 43c are positioned respectively in these spaces and held against the respective outer sides of the inner tube 430b. With the prismatic rod 42b fitted in the inner tube 430b, the horizontal shaft 42 is attached to the control lever support plate 26b through the biasing structure 43.

When the game player grips the grip rod 32 (see FIG. 2) and turns the control lever 3 about the axis of the grip rod 32, the prismatic rod 42b and hence the inner tube 430b elastically deforms the rubber recovery members 43c, which store resilient recovery forces. When the game player releases the grip rod 32, the control lever 3 automatically returns to its original position under the resilient recovery forces stored in the rubber recovery members 43c, which now recover their original shape.

Unlike ordinary helical springs, the biasing structure 43 imparts recovery forces that are relatively small when the angular displacement of the horizontal shaft 42 about its own axis is small, but increase quadratically as the horizontal shaft 42 increases the angular displacement about its own axis. Such quadratically variable recovery forces generated by the biasing structure 43 give the hands of the game player responses similar to those which will actually be experienced by the pilot of a hang glider that is in actual flight.

Figure 4:
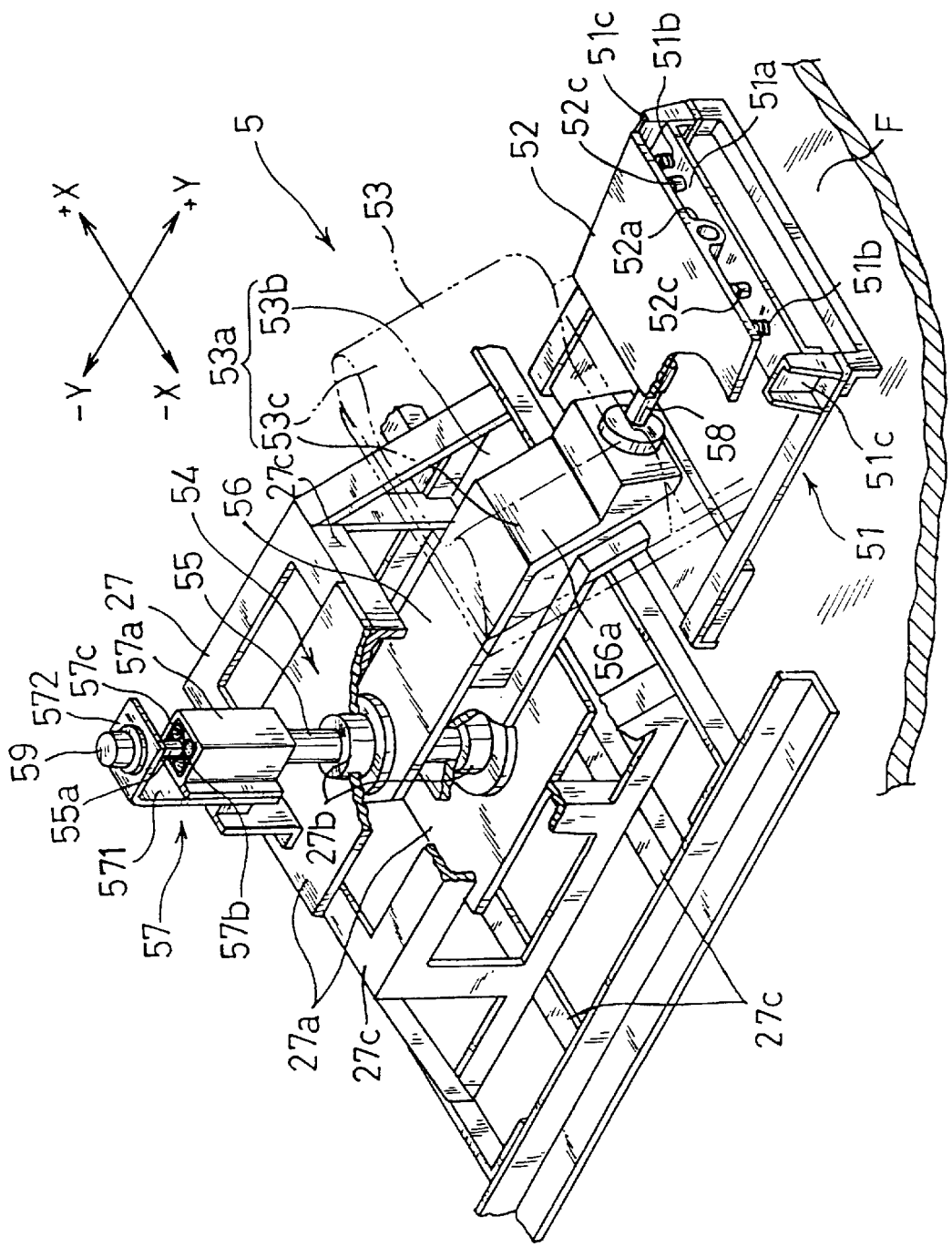
FIG. 4 is a fragmentary perspective view of a body holder of the flight simulation game apparatus.

FIG. 4 shows the body holder 5 in detail. As shown in FIG. 4, the body holder 5 comprises a body holder frame 51, a leg rest 52 and a thigh support 53 which are mounted on the body holder frame 51, and a body holder moving mechanism 54 for moving the body holder frame 51 in the transverse directions −X, +X.

The body holder frame 51 is of a rectangular shape as viewed in plan, and is positioned behind the lower portion of the framework 2 and has its bottom spaced upwardly from the floor F. The leg rest 52 is in the form of a flat plate disposed on a rear portion of the body holder frame 51 and has its general plane inclined at a small angle downwardly in the forward direction −Y. The thigh support 53 is positioned in front of the leg rest 52 and inclined upwardly in the forward direction −Y. The angle at which the leg rest 52 is inclined to the horizontal plane is selected such that the game player on the body holder 5 has its body tilted forwardly, and the angle at which the thigh support 53 is inclined to the horizontal plane is selected such that the forwardly tilted body of the game player can be borne by the legs of the game player on the leg rest 52.

The thigh support 53 has a rear surface supporting thereon a pad 53a made of a soft material such as cellular plastic or the like. The pad 53a has a central vertical valley or trough 53b and a pair of side ridges 53c disposed one on each side of the central vertical trough 53b. When the game player is positioned on the body holder 5 with the legs placed on the leg rest 52, the thighs are fitted in the central vertical trough 53b between the side ridges 53c.

The body holder moving mechanism 54 is supported on an inner frame 27 disposed in a front region of the lower portion of the framework 2. The inner frame 27 comprises upper and lower pairs of longitudinally spaced, transverse angles 27c, a pair of vertically spaced, upper and lower support plates 27a mounted on the transverse angles 27c and extending longitudinally therebetween, and a pair of vertically spaced, upper and lower bearings 27b fixedly mounted on the respective support plates 27a in concentric relation to each other.

The body holder moving mechanism 54 comprises a vertical shaft 55 rotatably supported on the upper and lower bearings 27b for angular movement about its own axis, a horizontal connector 56 connected at a front end thereof to the vertical shaft 55 between the bearings 27b, and a second biasing structure 57 mounted on an upper end of the vertical shaft 55 which projects upwardly from the upper bearing 27b.

The connector 56 extends rearwardly from the vertical shaft 55 out of the inner frame 27 to a position behind the lower portion of the framework 2. The connector 56 has a slanted rear end 56a inclined downwardly in the backward direction +Y. The body holder frame 51 has a front end fixedly connected to the slanted rear end 56a. Therefore, the body holder frame 51 is angularly movable in the transverse directions −X, +X within a predetermined angular range about the vertical shaft 55.

The second biasing structure 57 is basically identical to the biasing structure 43. The second biasing structure 57 comprises a bracket 57a attached to an upstanding support plate 571 which is mounted on a front end of the upper support plate 27a parallel to the vertical shaft 55, an outer tube 57b fitted in the bracket 57a, and four cylindrical rubber recovery members 57c mounted in the outer tube 57b.

The vertical shaft 55 has a prismatic rod 55a on its upper end which is fitted in an inner tube, with the four cylindrical rubber recovery members 57c interposed between the inner tube and the outer tube 57b. Therefore, when the vertical shaft 55 is turned about its own axis, the four cylindrical rubber recovery members 57c are elastically deformed, storing recovery forces. When the body holder frame 51 is angularly moved about the vertical shaft 55, the angular movement of the body holder frame 51 is transmitted through the connector 56, the vertical shaft 55, the prismatic rod 55a, and the inner tube to the recovery members 57c, which then store recovery forces tending to resist the angular movement of the body holder frame 51.

An oblique shaft 58, which extends parallel to and below the leg rest 52, is mounted on and extends rearwardly from the slanted rear end 56a of the connector 56. The leg rest 52 supports on its lower surface a bearing 52a fitted over the oblique shaft 58 for allowing the leg rest 52 to be angularly moved about the oblique shaft 58.

The support plate 571 includes a horizontal seat 572 extending horizontally rearwardly from its upper end, and the prismatic rod 55a of the vertical shaft 55 has an upper end projecting upwardly through the horizontal seat 572. A second angular displacement sensor 59 is fixed coaxially to the projecting upper end of the prismatic rod 55a for detecting an angular displacement of the vertical shaft 55 and hence the leg rest 52.

The body holder frame 51 includes a pair of transversely spaced angles 51c mounted on a rear end thereof and a bridge plate 51a extending between and fixed to the angles 51c below the oblique shaft 58. Two transversely spaced helical springs 51b, which can apply the same biasing forces, are interposed between the leg rest 52 and the bridge plate 51a, one on each side of the oblique shaft 58. The helical springs 51b exert resilient biasing forces to normally keep the leg rest 52 in a horizontal attitude. When the game player places more body weight on one of the legs on the leg rest 52, hoe leg rest 52 is tilted from the horizontal attitude about the oblique shaft 58, depressing its portion under the weighted leg.

Angular displacement sensors 52c are interposed between the leg rest 52 and the bridge plate 51a, one on each side of the oblique shaft 58, for detecting an angular displacement of the leg rest 52.

As shown in FIG. 2, the display monitor 6 comprises a front monitor unit 61 positioned in front of the control lever 3 between the upstanding frames 25 and a lower monitor unit 62 positioned below the control lever 3 and the front monitor unit 61 and between the horizontal bars 24b. The front monitor unit 61 has a monitor screen facing rearwardly and lying substantially vertically. The lower monitor unit 62 has a monitor screen facing upwardly and inclined upwardly in the forward direction -Y. When the game player who has the legs placed the leg rest 52, the thighs on the thigh support 53, and the hands gripping the grip rod 32 directs the line of sight forwardly, the game player can view the monitor screen of the front monitor unit 61. When the game player directs the light of sight downwardly, the game player can view the monitor screen of the lower monitor unit 62.

The control system 7 is positioned in a space that is defined in the rear end of the lower portion of the framework 2. The control system 7 will be described in detail below with reference to FIG. 5. The control system 7 shown in FIG. 5 serves to control images displayed on the display monitor units 61, 62. Basically, the control system 7 controls the displayed images based on angular movement of the control lever 3 about the horizontal shaft 42 and the angular movement of the leg rest 52 and the thigh support 53 about the vertical shaft 55.

Figure 5:
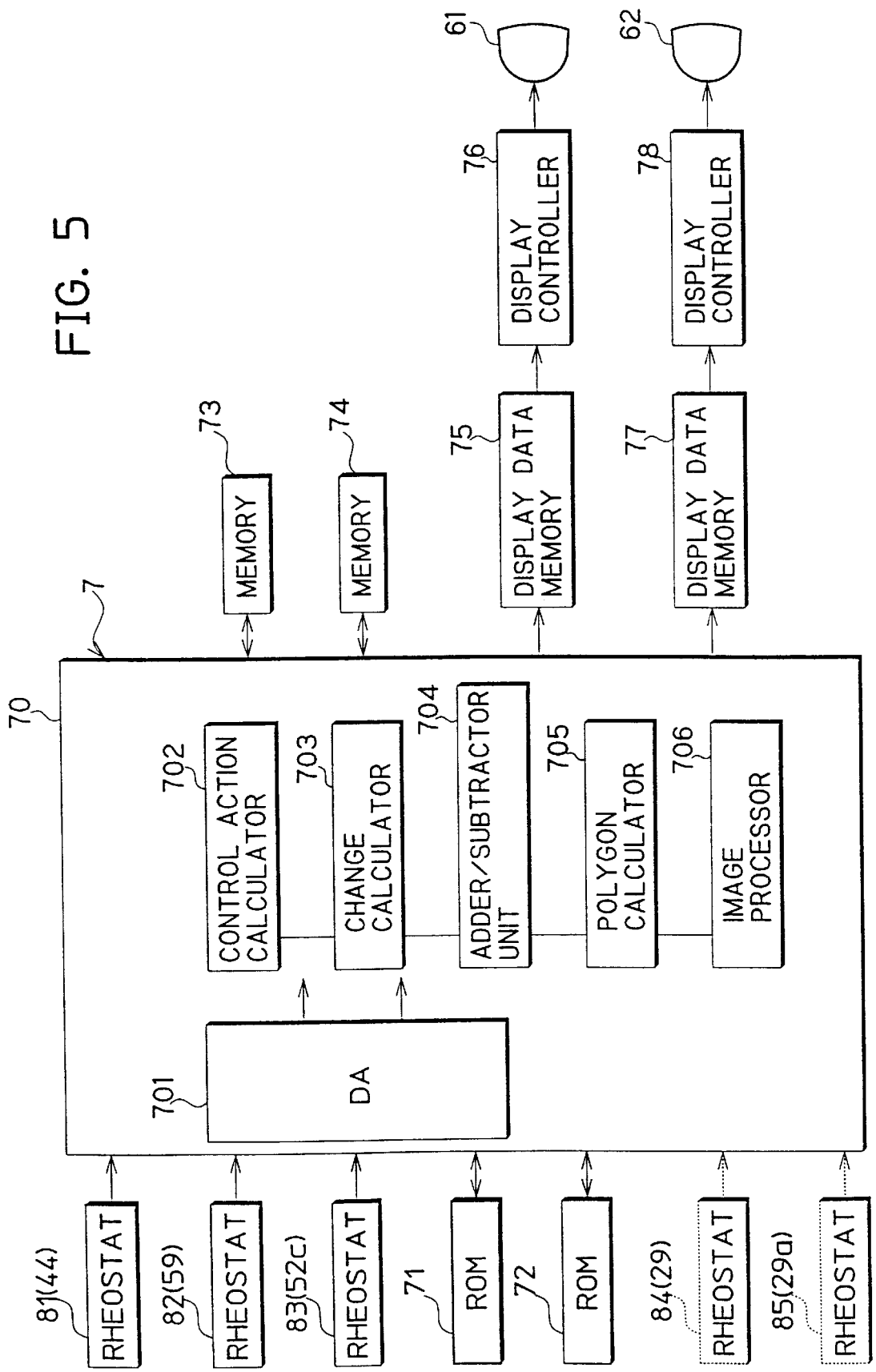
FIG. 5 is a block diagram of a control system for displaying images on display monitor units of the flight simulation game apparatus.

As shown in FIG. 5, the control system 7 has a microcomputer 70, a ROM 71 which stores a control program for controlling the display of images on the display monitor 6, a RAM 72 connected to the microcomputer 70 for temporarily storing processed data, and rheostats 81, 82 connected to the microcomputer 70 and incorporated in the angular displacement sensors 44, 59, respectively, and have respective resistances variable depending on the angular displacements detected by the displacement sensors 44, 59. Rheostats 83 that are incorporated in the angular displacement sensors 52c are connected to the microcomputer 70 and have respective resistances variable depending on the angular displacements detected by the displacement sensors 52c.

The control system 7 also has a memory 73 such as a magnetic disk, an optical disk, a ROM, or the like for storing data representing simulated front scenes to be displayed on the front monitor unit 61. These simulated front scenes may include, for example, scenes of mountains and surrounding regions in wide horizontal ranges as viewed horizontally from a spot (mountain top or the like) where the simulated hang glider has taken off in a simulated flight session and also horizontally from the viewpoint of the game player in simulated flight. The simulated front scenes contain various obstacles including the mountain from which a simulated flight session starts, other mountains, other flight objects, clouds, etc. The memory 73 stores data representing the coordinates of the vertexes of polygons divided from those obstacles and also data representing textures to be mapped onto the polygons.

The control system 7 also has a memory 74 such as a magnetic disk, an optical disk, a ROM, or the like for storing data representing simulated lower scenes to be displayed on the lower monitor unit 62. The simulated lower scenes may include, for example, ground scenes in wide ranges as viewed downwardly from the viewpoint of the game player in simulated flight. The simulated lower scenes contain artificial objects such as buildings, bridges, etc., and natural objects such as rivers, hills, etc. The memory 74 stores data representing the coordinates of the vertexes of polygons divided from those artificial and natural objects and also data representing textures to be mapped onto the polygons. The memories 73, 74 may comprise a single memory.

The microcomputer 70 has an A/D converter 701 for reading analog voltages detected from the rheostats 81, 82, 83 and converting the voltages into corresponding digital voltages, and performs various functions for calculating the present direction and position of sight of the game player based on the digital voltages from the A/D converter 701. Specifically, these functions include a control action calculator 702 for calculating voltage differences, as control actions of the control lever 3 and the body holder 5, between reference voltages that are detected from the rheostats 81, 82 when the vertical rods 31 of the control lever 3 are in a reference position in a vertical plane and the connector 56 of the body holder 5 is in a reference position parallel to the longitudinal directions -Y, +Y, and present voltages that are detected from the rheostats 81, 82 when the vertical rods 31 are angularly moved about the horizontal shaft 42 and the connector 56 is angularly moved about the vertical shaft 55, a change calculator 703 for calculating changes of the direction and position of sight from the previously calculated direction and position of sight based on the control actions calculated by the control action calculator 702, and an adder/subtractor unit 704 for adding the calculated changes to or subtracting the calculated changes from the previously calculated direction and position of sight. The microcomputer 7 effects the functions of the control action calculator 702, the change calculator 703, and the adder/subtractor unit 704 in every 1/60 second for thereby successively calculating the direction and position of sight. The position of sight corresponds to the height of the game player in the simulated flight, and the direction of sight corresponds to the present direction of the game player in the simulated flight relative to the direction in which the simulated hang glider has taken off in the present simulated flight session.

Furthermore, the functions performed by the microcomputer 70 also include a polygon calculator 705 for calculating data of display positions, sizes, and angular displacements of polygons to be displayed on the display monitor units 61, 62 based on the data of the calculated direction and position of sight, and an image processor 706 for applying the calculated data to polygons read from the memories 73, 74, mapping textures from the memories 73, 74 to the polygons, and supplying the polygon data together with shade data and background image data to display data memories 75. 77.

The control system 7 also includes a first display controller 76 for supplying front scene image data from the display data memory 75 to the front monitor unit 61 in every 1/60 second, and a second display controller 78 for supplying lower scene image data from the display data memory 77 to the lower monitor unit 62 in every 1/60 second.

As a consequence, when the game player operates the control lever 3 and the body holder 5 from their reference positions, front and lower simulated images displayed on the front and lower monitor units 61, 62 are continuously scrolled laterally and vertically based on the direction and position of sight of the game player that are periodically calculated by the microcomputer 7.

The front and lower simulated images are three-dimensionally displayed on the front and lower monitor units 61, 62 for the game player to view various objects and obstacles three-dimensionally in a realistic manner as the simulated hang glider ascends, descends, and turns and also as the objects and obstacles change their orientation by themselves. Furthermore, inasmuch as the simulated images are scrolled, the display data memories 75, 77 may be of a relatively small storage capacity for storing successive image data to be displayed at high speed.

Scrolling of simulated images displayed on the front and lower monitor units 61, 62 in response to control actions of the control lever 3 and the body holder 5 will be described below. When the game player pushes the control lever 3 forwardly, the game player is lifted in the simulated flight, so that the front simulated image displayed on the front monitor unit 61 is scrolled downwardly and the lower simulated image displayed on the lower monitor unit 62 becomes smaller. Conversely, when the game player pulls the control lever 3 rearwardly, the game player is lowered in the simulated flight, so that the front simulated image displayed on the front monitor unit 61 is scrolled upwardly and the lower simulated image displayed on the lower monitor unit 62 becomes greater.

When the game player moves the body holder 5 to the right, the game player turns to the left in the simulated flight, so that the front simulated image displayed on the front monitor unit 61 is scrolled to the right and the lower simulated image displayed on the lower monitor unit 62 is also scrolled to the right without changes in size. Conversely, when the game player moves the body holder 5 to the left, the game player turns to the right in the simulated flight, so that the front simulated image displayed on the front monitor unit 61 is scrolled to the left and the lower simulated image displayed on the lower monitor unit 62 is also scrolled to the left without changes in size.

When the game player moves the control lever 3 and the body holder 5 simultaneously, the front and lower simulated images displayed respectively on the front and lower monitor units 61, 62 are scrolled obliquely to the horizontal and vertical axes of the front and lower monitor units 61, 62.

When the leg rest 52 is angularly moved about the oblique shaft 58 by the legs of the game player, such angular movement of the leg rest 52 is detected by the angular displacement sensors 52c and reflected in the scrolling of the front and lower simulated images displayed respectively on the front and lower monitor units 61, 62.

Figure 6:
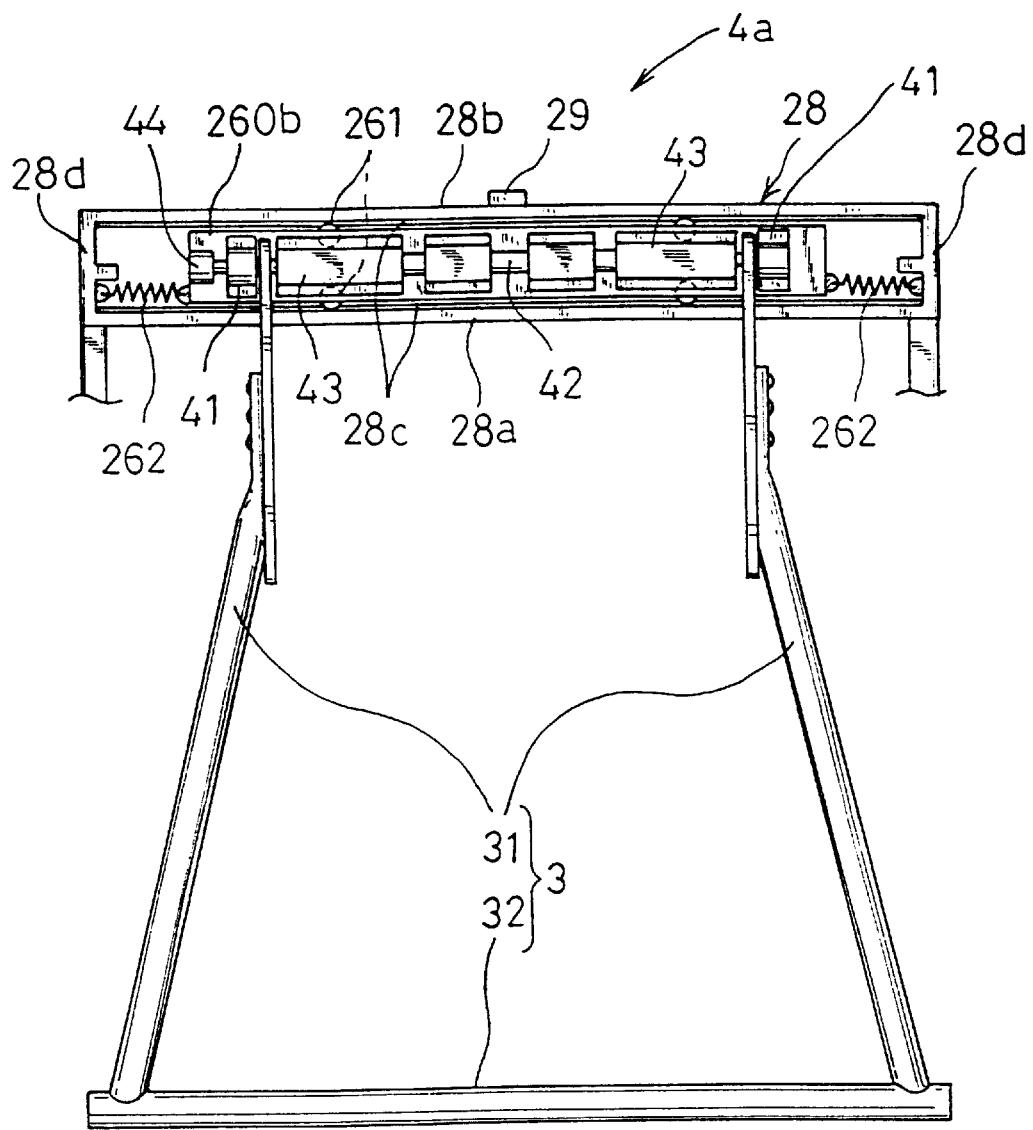
FIG. 6 is a front elevational view of a control lever moving mechanism according to a second embodiment of the present invention.

FIG. 6 shows a control lever moving mechanism 4a according to a second embodiment of the present invention. As shown in FIG. 6, the control lever moving mechanism 4a includes a control lever support plate 260b that is horizontally movable in the transverse directions of the flight simulation game apparatus for allowing a control lever 3 to be movable in a greater range to make the game player more interested in the flight simulation game. Specifically, a transverse guide frame 28 which is of an elongate rectangular shape is fixed to the rear end of the substantially square frame 26 shown in FIG. 2, and the control lever support plate 260b is transversely movably supported on the guide frame 28.

Bearings 41, a horizontal shaft 42, biasing structures 43, and an angular movement sensor 44 are mounted on the control lever support plate 260b, and a control lever 3 is connected to the horizontal shaft 42. The bearings 41, the horizontal shaft 42, the biasing structures 43, the angular movement sensor 44, and the control lever 3 which are shown in FIG. 6 are identical to those shown in FIG. 2.

As shown in FIG. 6, the guide frame 28 has a bottom plate 28a and a top plate 28b which are vertically spaced from each other. Guide rails 28c which confront each other are mounted respectively on inner surfaces of the bottom plate 28a and the top plate 28b. The guide frame 28 has a plurality of rotatable rollers 261 held in rolling engagement with and guided by the guide rails 28c. The control lever support plate 260b is transversely moved as the rollers 261 run along the guide rails 28c.

The guide frame 28 also has a pair of transversely spaced vertical side walls 28d joined to opposite ends of the bottom plate 28a and the top plate 28b. Helical springs 262 are connected to and act between the opposite ends of the control lever support plate 260b and the side walls 28d for normally holding the control lever support plate 260b in a neutral position which is transversely central in the guide frame 28. When the game player applies leftward or rightward forces to the control lever 3, the control lever support plate 260b is moved transversely in the guide frame 28 against the bias of the helical springs 262.

A linear displacement sensor 29 is mounted on the guide frame 28 for detecting a transverse linear displacement of the control lever support plate 260b. The linear displacement sensor 29 incorporates a rheostat 84 (indicated by the imaginary lines in FIG. 5) connected to the microcomputer 70. Therefore, a detected transverse linear movement of the control lever support plate 260b is supplied from the linear displacement sensor 29 to the control system 7 (see FIG. 5), so that simulated images displayed on the front and lower monitor units 61, 62 are scrolled depending on the transverse linear movement of the control lever support plate 260b.

Figure 7A:
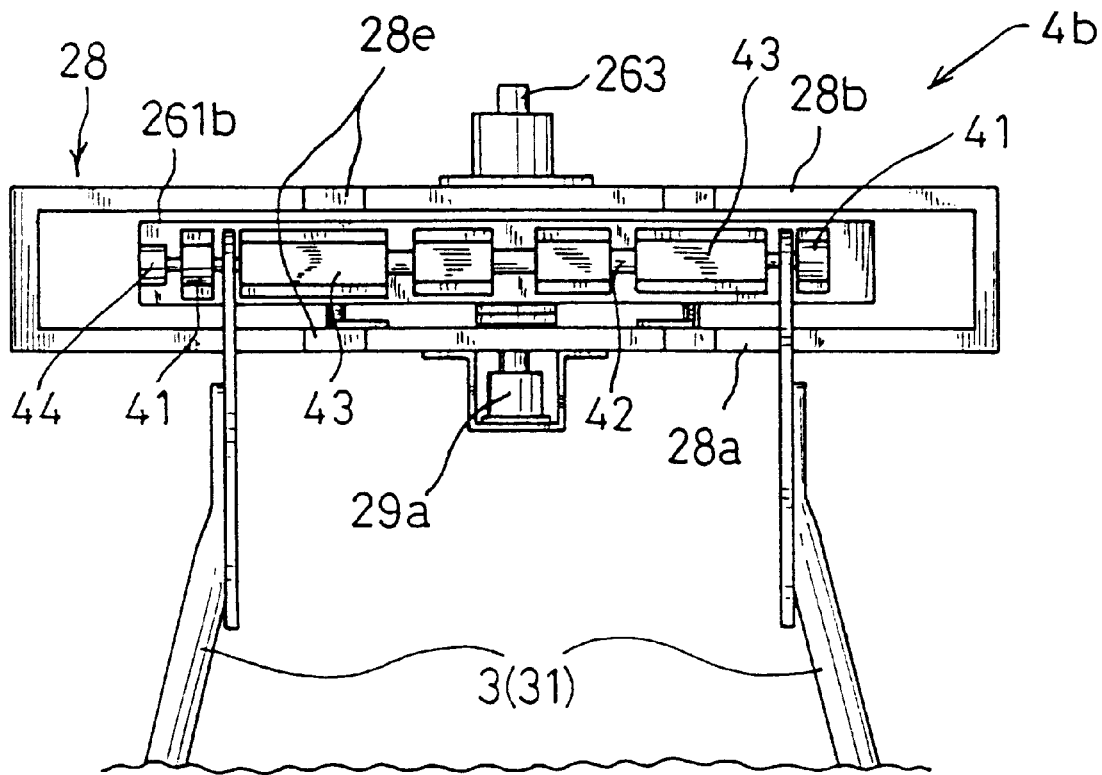
FIG. 7A is a front elevational view of a control lever moving mechanism according to a third embodiment of the present invention.
Figure 7B:
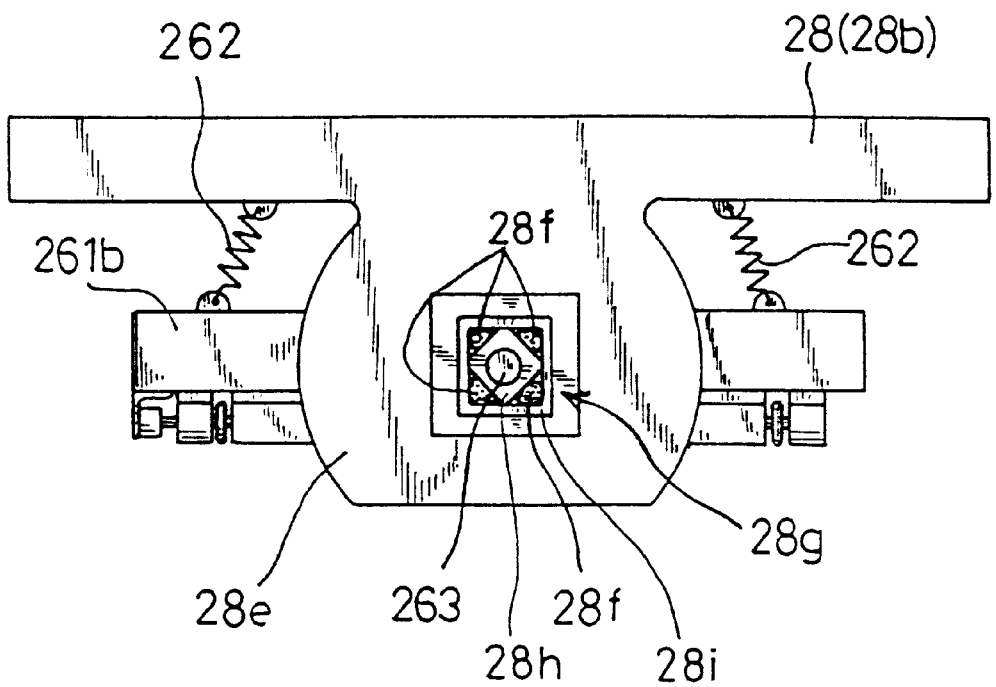
FIG. 7B is a plan view of the control lever moving mechanism according to the third embodiment of the present invention.

FIGS. 7A and 7B show a control lever moving mechanism 4b according to a third embodiment of the present invention. As shown in FIGS. 7A and 7B, the control lever moving mechanism 4b has a control lever support plate 261b mounted for angular movement about a vertical shaft 263. Specifically, a guide frame 28 has a bottom plate 28a and a top plate 28b which are vertically spaced from each other, and the bottom plate 28a and the top plate 28b have respective support wings 28e extending rearwardly (downwardly in FIG. 7B) from respective rear edges thereof and vertically spaced from each other. The vertical shaft 263 extends vertically through central regions of the support wings 28e. The control lever support plate 261b is fixed to the vertical shaft 263 between the support wings 28e for angular movement about the vertical shaft 263.

Bearings 41, a horizontal shaft 42, biasing structures 43, and an angular movement sensor 44 are mounted on the control lever support plate 261b, and a control lever 3 is connected to the horizontal shaft 42. The bearings 41, the horizontal shaft 42, the biasing structures 43, the angular movement sensor 44, and the control lever 3 which are shown in FIG. 7A are identical to those shown in FIG. 2.

Helical springs 262 are connected to and act between opposite end portions of the control lever support plate 261b and the guide frame 28. The control lever support plate 261b is normally held in a neutral position parallel to the guide frame 28 under the bias of the helical springs 262. When the game player turns the control lever 3 about the vertical shaft 263, the control lever support plate 261b are also turned about the vertical shaft 263 against the bias of the helical springs 262.

The control lever moving mechanism 4b also incorporates a biasing mechanism 28g identical to the biasing mechanisms 43, 57 described above, the biasing mechanism 28g having four cylindrical rubber recovery members 28f. The vertical shaft 263 is inserted through an inner tube 28h surrounded by the recovery members 28f that are housed in an outer tube 28i. When the game player turns the control lever 3 about the vertical axis 263, the recovery members 28f store recovery forces which are exerted as resistive forces that increase quadratically in proportion to the angular displacement of the control lever 3.

An angular displacement sensor 29a for detecting an angular displacement of the control lever support plate 261b about the vertical shaft 263 is mounted on a lower end of the vertical shaft 263 which projects downwardly from the lower support wing 28e. The angular displacement sensor 29a incorporates a rheostat 85 (indicated by the imaginary lines in FIG. 5) connected to the microcomputer 70. Therefore, a detected angular displacement is supplied from the angular displacement sensor 29a to the control system 7 (see FIG. 5), which scrolls images displayed on the front and lower monitor units 61, 62 depending on the angular displacement of the control lever support plate 261b and hence the control lever 3.

The control lever moving mechanisms 4a, 4b according to the second and third embodiments allow the control lever 3 to be movable transversely and angularly movable about the vertical shaft 263 as well as to be angularly movable about the horizontal shaft 42. Since such transverse and angular movements of the control lever 3 can be reflected in scrolling motions of the displayed images on the front and lower monitor displays 61, 62, the game player finds it more interesting to control the simulated hang glider in the simulated flight.

In the embodiment shown in FIG. 4, the leg rest 52 is angularly movable about the vertical shaft 55. However, the leg rest 52 may instead be movable in the longitudinal directions –Y, +Y. Specifically, longitudinal rails may be mounted on the floor F behind the framework 2, and wheels may be rotatably mounted on body holder frame 51 in rolling engagement with the rails, so that the leg rest 52 may be movable along the rails in the longitudinal directions –Y, +Y. Alternatively, transverse rails may be mounted on the floor F behind the framework 2, and wheels may be rotatably mounted on body holder frame 51 in rolling engagement with the rails, so that the leg rest 52 may be movable along the rails in the transverse directions –X, +X.

The connector 56 shown in FIG. 4 may be of a telescopic structure which can be extended and contracted in the longitudinal directions –Y, +Y, so that the leg rest 52 can be moved in the longitudinal directions –Y, +Y as well as angularly moved about the vertical shaft 55.

The inner frame 27 may be suspended in the framework 2 to allow the body holder moving mechanism 54 to be swingable such that the game player supported on the leg rest 52 and the thigh support 53 will be placed in a suspended condition while playing in the flight simulation game and hence may have a flying sensation similar to the feel in actual flight.

In the illustrated embodiment, the display monitor 6 comprises two monitor units, i.e., the front monitor unit 61 and the lower monitor unit 62. However, the display monitor 6 may have only one of the front monitor unit 61 and the lower monitor unit 62, or may comprise a single large-size monitor unit whose size is substantially the same as the combined size of the front monitor unit 61 and the lower monitor unit 62.

Although certain preferred embodiments of the present invention have been shown and described in detail, it should be understood that various changes and modifications may be made therein without departing from the scope of the appended claims.

What is claimed is:

1. A flight simulation game apparatus comprising:
   a framework having transverse and longitudinal directions;
   a control lever for being gripped by the hands of a game player positioned behind the control lever, said control lever being mounted on said framework and extending in the transverse direction;
   a control lever moving mechanism mounted on said framework, for allowing the control lever to be moved in the longitudinal direction with respect to said framework;
   a display monitor mounted on said framework, for displaying at least a front simulated scene image; and
   display control means for vertically scrolling the front simulated scene image displayed by said display monitor in response to movement of said control lever in the longitudinal direction.

2. A flight simulation game apparatus according to claim 1, wherein said control lever moving mechanism includes a mechanism for allowing the control lever to be moved in the transverse direction, and said display control means comprises means for horizontally scrolling the front simulated scene image displayed by said display monitor in response to movement of said control lever in the transverse direction.

3. A flight simulation game apparatus according to claim 1, wherein said control lever moving mechanism includes a mechanism for allowing the control lever to be angularly moved about a vertical axis, and said display control means comprises means for scrolling the front simulated scene image displayed by said display monitor in response to angular movement of said control lever about said vertical axis.

4. A flight simulation game apparatus comprising:
   a framework having transverse and longitudinal directions;

a body holder operatively coupled to said framework, for holding the body of a game player thereon;

a control lever for being gripped by the hands of the game player positioned behind the control lever, said control lever being mounted on said framework and extending in the transverse direction;

a body holder moving mechanism for allowing said body holder to be moved in the transverse direction with respect to said framework;

a display monitor mounted on said framework, for displaying at least a front simulated scene image; and display control means for horizontally scrolling the front simulated scene image displayed by said display monitor in response to movement of said body holder in the transverse direction.

5. A flight simulation game apparatus according to claim 4, wherein said body holder moving mechanism comprises a mechanism for allowing the body holder to be angularly moved about a vertical axis, and said display control means comprises means for scrolling the front simulated scene image displayed by said display monitor in response to angular movement of said body holder about said vertical axis.

6. A flight simulation game apparatus according to claim 4, wherein said body holder includes a leg rest for placing the legs of the game player thereon, said leg rest being angularly movable about a longitudinal axis extending in the longitudinal direction, and wherein said display control means comprises means for scrolling the front simulated scene image displayed by said display monitor in response to angular movement of said body holder about said longitudinal axis.

7. A flight simulation game apparatus according to claim 4, wherein said body holder includes a leg rest for placing the legs of the game player thereon and a thigh support for supporting the thighs of the game player thereon.

8. A flight simulation game apparatus according to claim 7, wherein said leg rest is inclined downwardly in a forward direction toward said framework, and said thigh support is inclined upwardly in said forward direction.

9. A flight simulation game apparatus comprising:

a framework having transverse and longitudinal directions;

a body holder operatively coupled to said framework, for holding the body of a game player thereon;

a control lever for being gripped by the hands of the game player positioned behind the control lever, said control lever being mounted on said framework and extending in the transverse direction;

a body holder moving mechanism for allowing said body holder to be moved in the transverse direction with respect to said framework;

a control lever moving mechanism mounted on said framework, for allowing the control lever to be moved in the longitudinal direction with respect to said framework;

a display monitor mounted on said framework, for displaying at least a front simulated scene image; and display control means for horizontally scrolling the front simulated scene image displayed by said display monitor in response to movement of said body holder in the transverse direction, and vertically scrolling the front simulated scene image displayed by said display monitor in response to movement of said control lever in the longitudinal direction.

10. A flight simulation game apparatus according to claim 9, wherein said body holder moving mechanism comprises a mechanism for allowing the body holder to be angularly moved about a vertical axis, and said display control means comprises means for scrolling the front simulated scene image displayed by said display monitor in response to angular movement of said body holder about said vertical axis.

11. A flight simulation game apparatus according to claim 9, wherein said body holder includes a leg rest for placing the legs of the game player thereon, said leg rest being angularly movable about a longitudinal axis extending in the longitudinal direction, and wherein said display control means comprises means for scrolling the front simulated scene image displayed by said display monitor in response to angular movement of said body holder about said longitudinal axis.

12. A flight simulation game apparatus according to claim 9, wherein said body holder includes a leg rest for placing the legs of the game player thereon and a thigh support for supporting the thighs of the game player thereon.

13. A flight simulation game apparatus according to claim 12, wherein said leg rest is inclined downwardly in a forward direction toward said framework, and said thigh support is inclined upwardly in said forward direction.

14. A flight simulation game apparatus according to any one of claims 1, 4, and 9, wherein said control lever moving mechanism includes a biasing mechanism for biasing said control lever to return to a reference position.

15. A flight simulation game apparatus according to any one of claims 4, and 9, wherein said body holder moving mechanism includes a biasing mechanism for biasing said body holder to return to a reference position.

16. A flight simulation game apparatus according to claim 15, wherein said biasing mechanism comprises a mechanism for generating recovery forces against an applied angular displacement at a rate that increases in proportion to the displacement from said reference position.

17. A flight simulation game apparatus according to any one of claims 1, 4, and 9, wherein said display monitor comprises a display monitor for displaying said front simulated scene image in an upper screen area thereof and displaying a lower simulated scene image in a lower screen area thereof.

18. A flight simulation game apparatus according to any one of claims 1, 4, and 9, wherein said display monitor comprises a first monitor unit for displaying said front simulated scene image, said first monitor being disposed in front of said control lever and having a monitor screen facing rearwardly toward said control lever, and a second monitor unit for displaying a lower simulated scene image, said second monitor unit being disposed below said control lever and having a monitor screen facing upwardly.

* * * * *